United States Patent [19]

Haferl

[11] Patent Number: 4,634,937
[45] Date of Patent: Jan. 6, 1987

[54] EAST-WEST CORRECTION CIRCUIT

[75] Inventor: Peter E. Haferl, Adliswil, Switzerland

[73] Assignee: RCA Corporation, Princeton, N.J.

[21] Appl. No.: 651,301

[22] Filed: Sep. 17, 1984

[30] Foreign Application Priority Data

Nov. 23, 1983 [GB] United Kingdom ................ 8331283

[51] Int. Cl.[4] .............................................. H01J 29/56
[52] U.S. Cl. ..................................... 315/371; 315/408
[58] Field of Search ................ 315/371, 387, 408, 411

[56] References Cited

U.S. PATENT DOCUMENTS

| | | | |
|---|---|---|---|
| 4,140,949 | 2/1979 | Terry | 315/371 |
| 4,329,729 | 5/1982 | Knight | 361/91 |
| 4,429,257 | 1/1984 | Haferl | 315/371 |

Primary Examiner—Theodore M. Blum
Assistant Examiner—Gregory C. Issing
Attorney, Agent, or Firm—Eugene M. Whitacre; Joseph J. Laks; Sammy S. Henig

[57] ABSTRACT

In a deflection circuit, a flyback transformer and a retrace resonant circuit that includes a deflection winding are mutually coupled by a relatively small capacitor during the retrace interval so as to reduce transient distortions that may be caused by a sudden high beam current change. East-west modulation is provided to the deflection circuit output stage via an impedance having a relatively large value at the retrace frequency. A resonant circuit that includes the deflection winding and the flyback transformer is tuned to the retrace frequency. Synchronization information of the current through the deflection winding may be derived from a winding of the flyback transformer.

24 Claims, 6 Drawing Figures

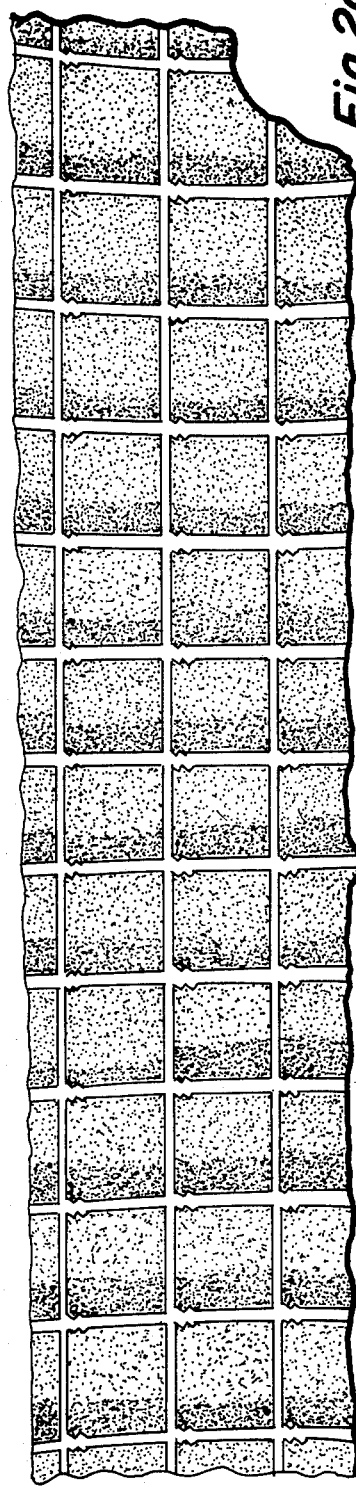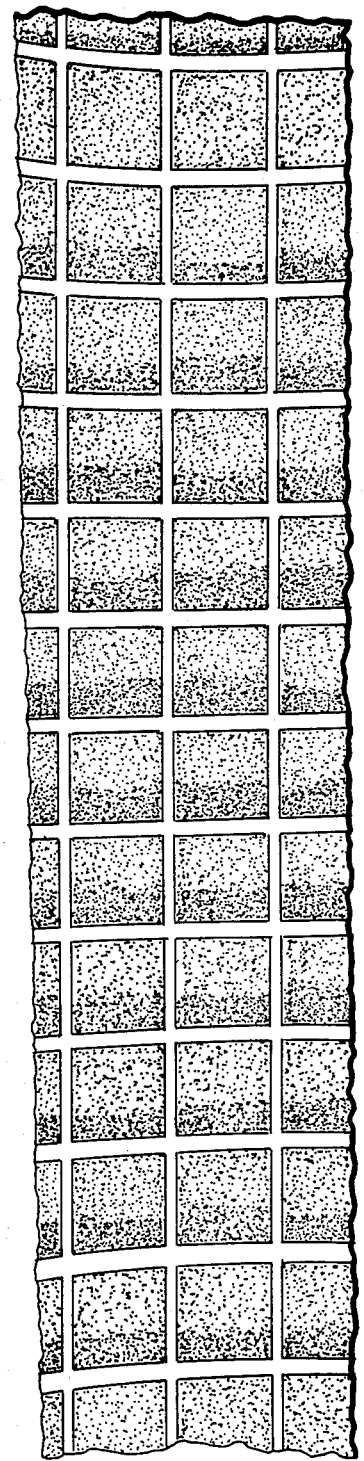

EQUIVALENT CIRCUIT OF THE DEFLECTION CIRCUIT
OF FIGURE 1 OR 3 DURING RETRACE.

WAVEFORMS OF DEFLECTION CIRCUIT 101 OF FIGURE 3

EAST-WEST CORRECTION CIRCUIT

This invention relates to a deflection circuit in which the amplitude of the deflection current may be varied or modulated over a relatively wide range without substantially affecting the high voltage amplitude or the deflection retrace time. Modulation of the deflection current amplitude is desired for such purposes as east-west pincushion distortion correction and picture width adjustment.

A disadvantage of known deflection circuits is that they are susceptible to transient disturbance of the trace deflection current when a retrace load current in a secondary winding of the flyback transformer changes abruptly. Such transient disturbance is highly visible when a crosshatch pattern of bright horizontal and vertical strips is displayed on the screen of a picture tube.

The horizontal deflection circuit, in some conventional television receivers, encompasses an output state that includes a horizontal deflection winding and a trace capacitor that supplies deflection current to the deflection winding during each trace interval. A retrace capacitor is coupled across the deflection winding during the retrace interval. Energy is replenished during retrace via a flyback transformer. When a crosshatch pattern is displayed, each high luminance horizontal strip of the crosshatch pattern causes a high beam current to flow in a secondary winding of the flyback transformer during retrace. Such high beam current represents a heavy load to the flyback transformer during retrace. The retrace capacitor is slightly discharged during retrace due to this loading. This results in a discharge current from the trace capacitor into the retrace capacitor through the deflection winding and a slight drop of the voltage across the trace capacitor during the white horizontal strips of the crosshatch pattern. The charge of the trace capacitor is replenished during the retrace intervals associated with the scan lines that display the black picture portion underneath the white crosshatch stripes. This causes a small current in the opposite direction through the deflection winding. The charge and discharge current of the trace capacitor produces a small raster displacement and results in low frequency oscillations modulating the deflection winding trace current. This low frequency modulation may cause each vertical strip of the crosshatch pattern to appear as being of a zig-zag shape, instead of a straight line shape. The zig-zag shape appears in a given vertical strip immediately below the intersection point with a horizontal strip. Such distortions are sometimes referred to by the name "mouseteeth" distortions and are illustrated in the crosshatch pattern of FIG. 2a. They appear, during and just after the times in which high beam transients occur, because the deflection circuit that represents a low impedance energy flywheel, supplies the transient increase in energy requirement of the ultor circuits. Thus, energy transferred from the deflection circuit to the ultor circuits may tend to cause variations in the deflection winding trace current.

In U.S. Pat. No. 4,429,257 entitled, VARIABLE HORIZONTAL DEFLECTION CIRCUIT CAPABLE OF PROVIDING EAST-WEST PINCUSHION CORRECTION, in the name of P. E. Haferl, hereinafter referred to as the Haferl patent, there is disclosed a deflection circuit that reduces "mouseteeth" distortions. One deflection circuit that is disclosed in the Haferl patent, is controlled by a controllable switch. The controllable switch operated at a deflection rate, is coupled to a deflection winding to generate scanning current in the deflection winding during each trace interval. A first deflection retrace capacitance forms a deflection retrace resonant circuit with the deflection winding during each retrace interval. A primary winding of a flyback transformer is coupled to a second retrace capacitance and to the controllable switch to form a second resonant circuit within the retrace interval and generates a pulse voltage that energizes the ultor circuits.

During the retrace interval, the two resonant circuits are substantially decoupled from each other at the deflection retrace and higher frequencies by using an inductive impedance that decouples the two resonant circuits. This decoupling avoids the undesirable interaction of energy transfer between the two resonant circuits thus preventing the occurrence of "mouseteeth" distortions. The two resonant circuits may produce, however, two retrace pulses, respectively, of different durations. Furthermore, because of this decoupling between the two resonant circuits, the retrace period in the second resonant circuit may vary as a function of beam current, whereas the resonant period in the resonant circuit that includes the deflection winding may not vary.

East-west pincushion distortion correction is accomplished in the Haferl patent by supplying modulation current from a modulation current source that varies at a vertical rate, through the decoupling inductive impedance. During the retrace interval, the amount of energy supplied to the retrace resonant circuit is directly related to the modulation current provided by the modulation source. Therefore, the peak current flowing in the deflection winding at the beginning of trace time, for example, is also made to vary at a vertical rate, in a parabolic manner, to achieve east-west pincushion distortion correction.

It is desirable to form a deflection circuit such as described in the Haferl patent that reduces "mouseteeth" distortions. Also it is desirable to combine two resonant circuits that include the flyback transformer and the deflection winding, respectively, for obtaining retrace pulses that carry synchronization information of the combined resonant circuits.

In accordance with an aspect of the invention, a resonant circuit includes a first retrace capacitance and a deflection winding. A retrace pulse voltage is developed across a supply inductance. A second retrace capacitance couples to the resonant circuit a voltage obtained from the supply inductance retrace pulse voltage. A source of modulation current is coupled to the resonant circuit through an impedance that at the deflection retrace frequency is substantially higher than the corresponding impedance of the deflection winding.

In carrying out an aspect of the current invention, the resonant circuit comprises a parallel resonant circuit that is tuned to a resonance frequency that is lower than the retrace frequency. The parallel resonant circuit is coupled to a series resonant circuit that includes the primary winding of the flyback transformer. The series resonant circuit is tuned to a frequency that is also lower than the retrace frequency. The inductive component of the series resonant circuit compensates for the capacitive component of the parallel resonant circuit so that the combined circuit formed by both resonant circuits resonates at the desirable retrace frequency.

In carrying out another aspect of the invention, the deflection winding is decoupled from the flyback transformer via a relatively high inductive choke so as to avoid "mouseteeth" distortions. The flyback transformer primary winding and the deflection winding are included in one resonant circuit for obtaining a retrace pulse for every deflection cycle in a winding of the flyback transformer. The retrace pulse in the winding of the flyback transformer is representative of the retrace voltage across the delfection winding because of the capacitive coupling between the two resonant circuits that is provided by the second retrace capacitance. such retrace pulse may be used for providing phase synchronization information of the deflection current in the deflection winding.

FIG. 2a and 2b illustrate crosshatch patterns with and without "mouseteech" distortions, respectively;

Figure 1:
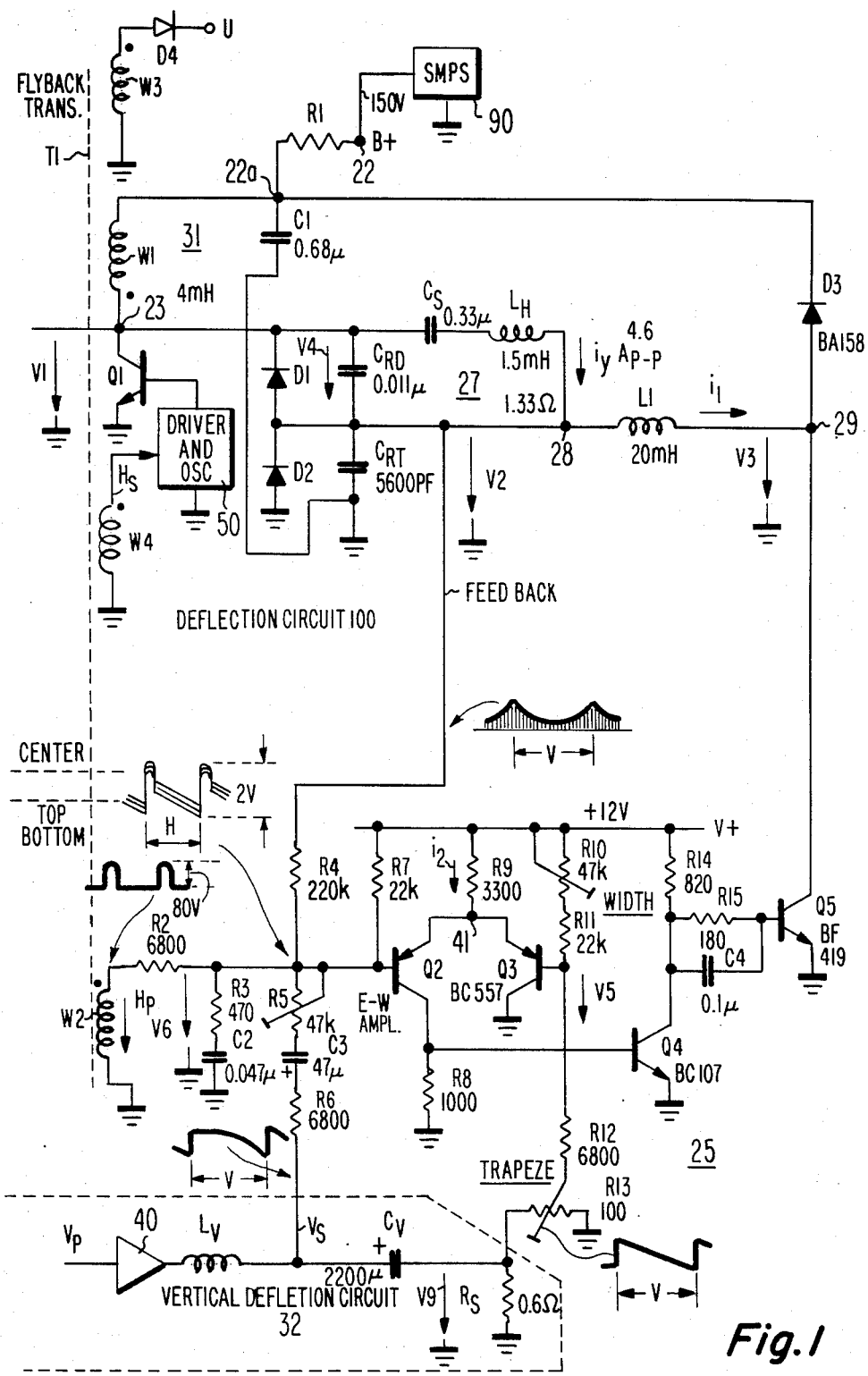
FIG. 1 illustrates a deflection circuit, embodying an aspect of the invention, that includes a controllable switch.

Deflection circuit 100 of FIG. 1, embodying an aspect of the invention, may, for example, provide horizontal deflection, for Philips 30AX 110° color picture tube. In FIG. 1, a source of regulated direct current voltage B+, developed between a terminal 22 and ground, is copuled through a resistor R1 to a terminal 22a of a primary winding W1 of a horizontal flyback transformer T1. The other terminal of winding W1 is coupled to a junction terminal 23. A filtering capacitor C1 is coupled from terminal 22a to ground. Regulated voltage B+ is generated by a switched mode power supply 90. A secondary winding W3 of transformer T1, supplies an ultor voltage U and a beam current through a diode D4.

A horizontal output transistor Q1, having its base coupled to a conventionally built driver and oscillator circuit 50, has its collector to emitter path coupled between jucntion terminal 23 and ground. Paralleling transistor Q1 is the series arrangement of two rectifiers, diodes D1 and D2. Coupled between the anode and cathode electrodes of diode D1 is the series arrangement of a horizontal deflection winding $L_H$, and an S-shaping, or trace, capacitor $C_s$. A deflection retrace capacitor $C_{RD}$, coupled also between the anode and cathode electrodes of diode D1, forms with capacitor $C_s$ and with deflection winding $L_H$, a parallel retrace resonant circuit 27. A second retrace capacitor $C_{RT}$ is coupled between a junction terminal 28 and ground. Coupled between a terminal 28 of deflection winding $L_H$, at the junction between deflection winding $L_H$ and capacitor $C_{RD}$, and ground, is the series arrangment of choke L1, and a controllable switched current arrangement 25 that includes a switching transistor Q5 and a diode D3. The inductance of choke L1 is substantially higher than that of deflection winding $L_H$.

During the trace interval the circuit that includes primary winding W1, transistor Q1, diodes D1 and D2, capacitor $C_s$ and inductor $L_H$, operates as a conventional well known deflection circuit. Synchronization of the switching of transistor Q1 is derived, illustratively, from phase information of pulses $H_s$ that are supplied by a second winding W4 of flyback transformer T1, as described later on.

During the retrace interval, charge is added to retrace capacitor $C_{RD}$ by sink current $i_1$ that flows via choke L1. The higher the integral, $\int i_1 \cdot dt$, during the entire retrace interval, for example, the higher becomes the voltage V4 across capacitor $C_{RD}$. It should be understood that peak deflection current $i_y$ through deflection winding $L_H$, during the trace interval, is directly related to the peak of voltage V4 across capacitor $C_{RD}$ at the center of the retrace interval. By modulating the current $i_1$ at a vertical rate, switched current arrangement 25 provides east-west pincushion correction to the horizontal scanning current.

The control circuit in controllable switched current arrangement 25, includes a differential pair of transistors Q2 and Q3, where both emitters of transistors Q2 and Q3, respectively, are coupled to a terminal 41 of a resistor R9. The other terminal of resistor R9 is coupled to a volatge source V+. Current $i_2$, flowing in resistor R9, is split between transistors Q2 and Q3, respectively, in response to the difference voltage V6-V5 developed between the bases of transistor Q2 and Q3, respectively.

The collector current of transistor Q2 controls, via an inverting and driving transistor Q4, a switching transistor Q5 of arrangement 25 that operates in common emitter mode. The collector of transistor Q5 is coupled to a terminal 29 of choke L1 that is remote from resonant circuit 27. Thus, transistor Q5 is switched off and on, respectively, in accordance with the amplitude of the difference voltage V6-V5. Terminal 29 of choke L1 is also coupled through a diode D3 of switched current arrangement 25 to terminal 22a that is at approximately the potential of volatge B+. Diode D3 is poled to divert current $i_1$ that flows through choke L1, and to clamp the voltage V3 at terminal 29, when transistor Q5 is turned off, to the voltage that is present across capacitor C1. Conversely, when transistor Q5 is turned on, current $i_1$ flows to ground through transistor Q5 causing voltage V3 to be at approximately ground potential.

Horizontal retrace pulses $H_p$, developed across a secondary winding W2 of flyback transformer T1, are coupled to the base of transistor Q2 through a resistor R2 and across a series arrangement of a resistor R3 and a capacitor C2. A vertical rate signal $V_s$, having a parabolic shape superimposed on a vertical sawtooth that is produced by a conventionally built vertical deflection circuit 32, is coupled to the base of transistor Q2 through a series raster control arrangement of resistors R6, R5 and capacitor C3. thus, the base of transistor Q2 acts as a voltage summing junction. Vertical sawtooth voltage V9 across a sampling resistor $R_S$ of vertical deflection circuit 32 has a vertical rate sawtooth component. Voltage V9 is applied through a trapeze control resistor R13, that in parallel with resistor $R_S$, to one terminal of a resistor R12. The other terminal of resistor R12 is coupled to the base of transistor Q3. Trapeze control resistor R13 is adjusted to cancel by common mode rejection the vertical sawtooth portion at the base of transistor Q2. The bias voltage level V5, at the base of transistor Q3, is controlled by a series arrangement of a variable resistor R10 and a fixed resistor R11. The series arrangement of resistors R10 and R11 is interposed between voltage source V+ and the base of transistor Q3.

Voltage V2 between terminal 28 of choke L1 and ground is also coupled through a resistor R4 to the base of transistor Q2 to provide feedback that stabilizes the operation of deflection circuit 100. Thus, capacitor C2 coupled to the base of transistor Q2 integrates the pulses of voltage V2, that is described later on, to provide a vertical rate parabolic waveform feedback.

The difference voltage V6-V5 modulates the time in which transistor Q5 is turned off during each horizontal trace interval in accordance with the vertical position of the scanning beam in the cathode ray tube screen.

Current $i_1$ flows during each horizontal scanning trace interval through diode D2, choke $L_1$ and transistor Q5 to ground until transistor Q5 is turned off at a controllable time. When transistor Q5 is turned off, current $i_1$ is diverted to flow through diode D3. This produces a slow decay of current $i_1$ during the remainder of the trace interval. During the retrace interval, current $i_1$ increases. Because of the high impedance of choke L1 relative to that of deflection winding $L_H$ during retrace, no significant coupling is produced between retrace resonant circuit 27 and primary winding W1 for high frequency load related currents in the primary winding. Because choke L1 does not provide a low impedance path for such currents, "mouseteeth" distortions are avoided or significantly reduced in a similar way to that described in detail in the aforementioned Haferl patent, herein incorporated by reference. FIG. 2a illustrates "mouseteeth" distortions that occur when a crosshatch pattern is displayed in some circuit of the prior art. FIG. 2b illustrates a crosshatch pattern free of "mouseteeth" distortions, such as may be obtained when circuit 100 of FIG. 1 is employed.

Figure 4:
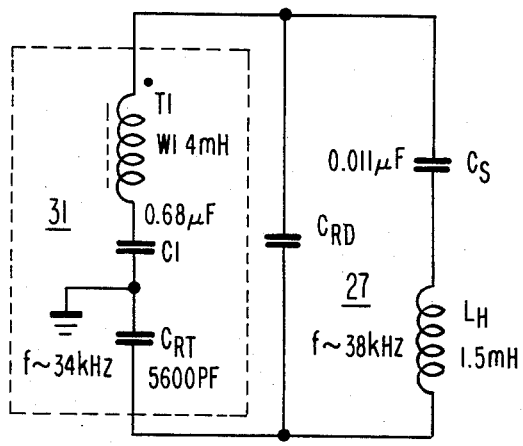
FIG. 4 illustrates an electrical equivalent circuit of the deflection circuit of FIG. 1 or of FIG. 3.

FIG. 4 illustrates the equivalent circuit of deflection circuit 100 of FIG. 1 during retrace. Primary winding W1 and capacitor $C_{RT}$ form a series resonant circuit 31 having its resonance frequency at a frequency below the horizontal retrace frequency. Capacitor $C_{RD}$ and deflection winding $L_H$ form a parallel resonant circuit 27 having its resonance frequency at a frequency which is also below the horizontal retrace frequency. The circuit formed by the combined series and parallel resonant circuits is tuned, however, to the retrace resonant frequency. The retrace pulse voltage within primay winding W1 carries common synchronization information as in the retrace pulse voltage and thus as in the retrace portion of the current $i_y$ in deflection winding $L_H$.

As explained before, secondary winding W4 of transformer T1 of FIG. 1 provides, illustratively, horizontal synchronizing pulses $H_s$. Each pulse $H_s$ represents the retrace interval in deflection winding $L_H$. Horizontal synchronizing pulse $H_s$ is coupled to driver and oscillator circuit 50 for providing synchronization information. The sychronization information contained in pulses $H_s$ may be indicative of the phase of current $i_y$ in deflection winding $L_H$. It may be used, illustratively, in conjunction with horizontal sync pulses of a television signal, not shown in FIG. 1, to adjust the phase of the oscillator signal that drives the base of transistor Q1.

Coupling between primary winding W1 of transformer T1 and retrace resonant circuit 27 is made through a capacitive voltage divider that includes capacitors $C_{RD}$ and $C_{RT}$. Capacitor $C_{RT}$ that is serially coupled between primary winding W1 and circuit 27 prevents a discharge of capacitor $C_s$ by a sudden retrace current load such as a sudden increase in the beam current. High impedance choke L1, which provides another current path between deflection retrace resonant circuit 27 and flyback transformer winding W1 prevents fast energy transfer through retrace resonant circuit 27 and transformer T1. Therefore, when using deflection circuit 100 of FIG. 1, "mouseteeth" distortions are substantially reduced.

Figure 3:
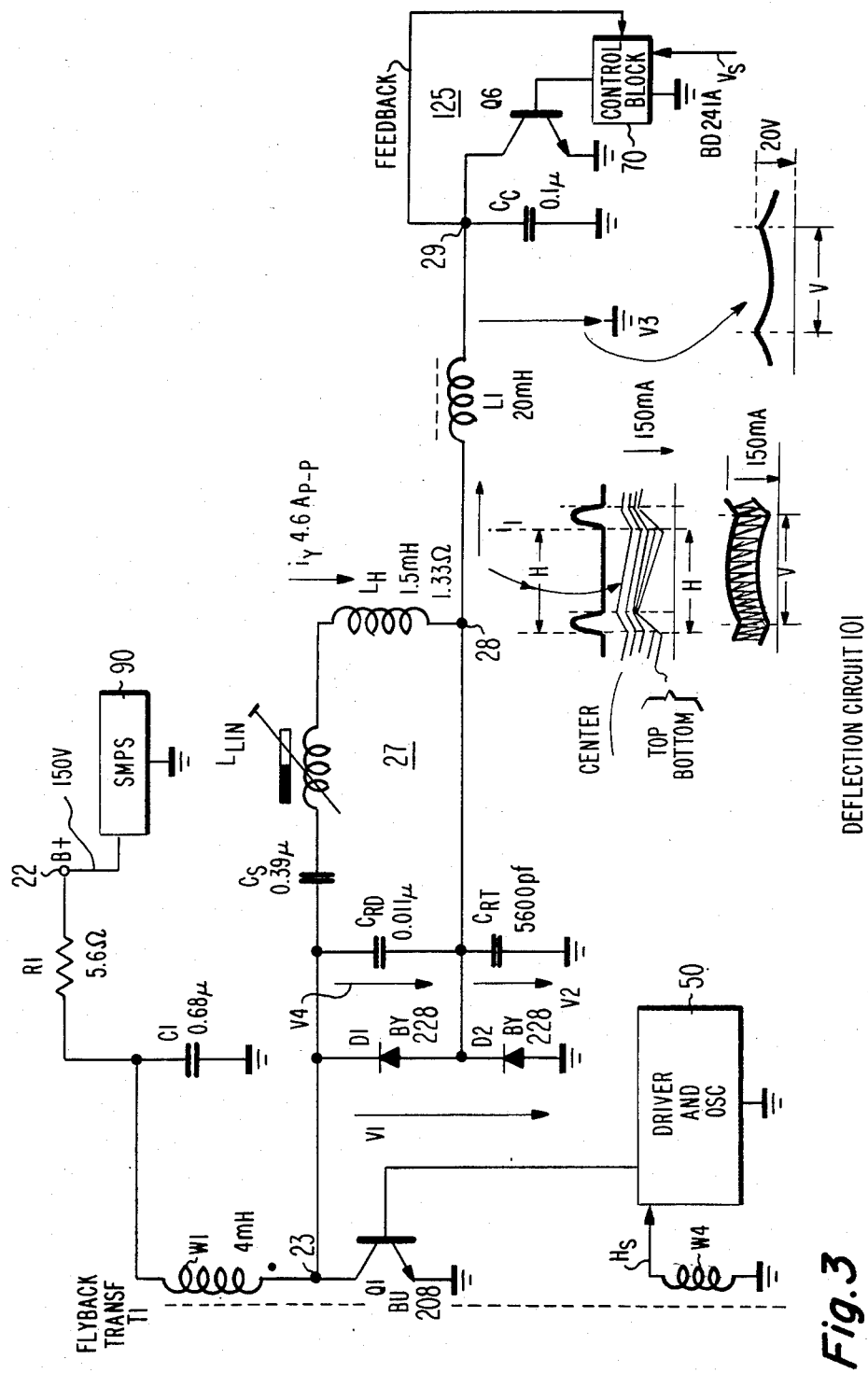
FIG. 3 illustrates a deflection circuit that includes a Class A mode current sink, embodying an aspect of the invention.

FIG. 3 illustrates another deflection circuit 101 embodying an aspect of the invention. Circuit 101 of FIG. 3 is generally similar to circuit 100 of FIG. 1. When using deflection circuit 101 of FIG. 3, "mouseteeth" distortions are similarly substantially reduced. Identical figures and symbols in FIGS. 1 and 3 indicate similar items or functions.

In deflection circuit 101 of FIG. 3, a controllable current arrangement 125, operating at Class A mode, is coupled to terminal 29 of choke L1. The modulated current through controllable current arrangement 125 provides east-west pincushion correction. It should be understood that current arrangements 25 and 125 of FIG. 1 and FIG. 3, respectively, may be interchangeable.

Controllable current arrangement 125 of FIG. 3, operating in Class A mode, includes a capacitor $C_c$ coupled between terminal 29 of choke $L_1$ and ground. A transistor Q6 having its collector coupled to terminal 29, sinks direct current that is equal to the average value of current $i_1$ through choke $L_1$. The collector current of transistor Q6, as controlled by a conventionally built control block 70, has a vertical rate parabolic waveform to provide east-west pincushion correction. A feedback voltage coupled from terminal 29 stablizies raster correction and width.

Figure 5:
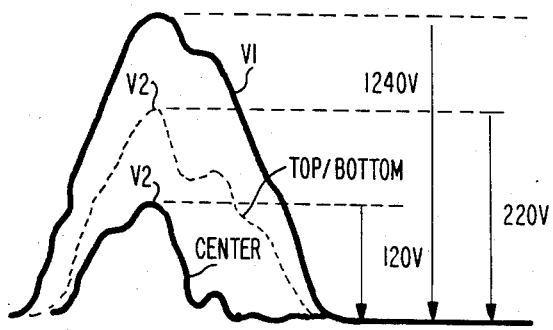
FIG. 5 illustrates waveforms, drawn to different scales, that are useful in explaining the operation of the circuit of FIG. 3.

FIG. 5 illustrates the waveform of retrace pulse voltage V1 for deflection circuit 101. FIG. 5 also illustrates retrace voltage V2 across capacitor $C_{RT}$ for top/bottom and center scanning examples in broken and solid lines, respectively.

What is claimed is:
1. A deflection circuit, comprising:
 a deflection winding;
 switching means coupled to said deflection winding and operated at a deflection rate to generate scanning current in said deflection winding during a trace interval of a deflection cycle;
 a source of supply energy;
 a supply inductance coupled to said switching means and said source of supply energy for producing therein a retrace pulse voltage during the retrace interval of the deflection cycle;
 first retrace capacitance that forms a retrace resonant circuit with said deflection winding during the retrace interval of the deflection cycle;
 a load circuit coupled to said supply inductance and energized during the retrace interval;
 a second retrace capacitance coupled to said retrace resonant circuit for coupling a voltage obtained from said retrace pulse voltage that is developed in said supply inductance to said retrace resonance circuit to replenish energy losses in said deflection winding during the deflection cycle;
 an impedance, that at the retrace frequency of said scanning curent is of substantially higher value than that of said deflection winding; and
 a source of modulation current coupled to said retrace resonant circuit through said impedance for producing modulation of saidscanning current as said modulation current varies in a manner to reduce pincushion distortion, wherein said impedance is interposed in a current path between said retrace resonant circuit and said supply inductance for reducing substantial energy transfer between said retrace resonant circuit and said load circuit during each retrace interval.

2. A deflection circuit according to claim 1, including a trace capacitance coupled to said deflection winding for applying a trace voltage thereto, wherein the amplitude of said scanning current varies as said trace voltage varies, and wherein said impedance couples said modulation current to said retrace resonant circuit for varying said trace voltage as said modulation current varies.

3. A deflection circuit according to claim 1, wherein said deflection circuit compries a horizontal deflection circuit and includes a source of vertical rate signal coupled to said source of modulation current for varying said modulation current at a vertical rate parabolic manner for providing an east-west pincushion correct scanning current waveform.

4. A deflection current according to claim 1, wherein said deflection circuit compries a horizontal deflection circuit and wherein said source of modulation current operates in Class A mode and said modulation current varies at a vertical rate in a parabolic manner to provide east-west correction.

5. A deflection circuit according to claim 1, wherein said impedance comprises a modulation inductance.

6. A deflection circuit according to claim 1, wherein said supply inductance comprises a primary winding of a flyback transformer.

7. A deflection circuit according to claim 1, wherein said source of modulation current is coupled to said second retrace capacitance for controlling the voltage across said first retrace capacitance during the retrace interval.

8. A deflection circuit according to claim 1, wherein said switching means includes a rectifier coupled across said second retrace capacitance for providing a current path to said modulation current during the trace interval.

9. A deflection circuit according to claim 1, wherein said retrace resonant circuit comprises a parallel resonant circuit, wherein said supply inductance and said second retrace capacitor form a second retrace resonant circuit and wherein said parallel and second resonant circuits form a combined resonant circuit.

10. A deflection circuit according to claim 9, wherein the resonant frequency of at least one of said parallel and second resonant circuits is lower than the retrace frequency of said scanning current.

11. A deflection circuit according to claim 10 wherein said combined resonant circuit is tuned to the retrace frequency of said scanning circuit.

12. A deflection circut according to claim 11 wherein said second retrace resonant circuit comprises the series arrangement of said supply inductance and said second retrace capacitor, said series arrangement being coupled across said first retrace capacitance.

13. A deflection circuit according to claim 1, wherein a resonant circuit during retrace that includes said firs and second retrace capacitances said supply inductance and said deflection winding substantially generates a retrace pulse in said supply inductance that provides the same synchronization information that is contained in the retrace pulse across said deflection winding during each retrace interval.

14. A deflection circuit according to claim 1, wherein said impedance reduces substantial energy transfer between said retrace resonant circuit and said load circuit to substantially reduce mouseteeth distortions.

15. A deflection circuit according to claim 1, wherein said source of modulation current comprises a switched current means for supplying a first voltage level at a terminal of said impedance that is remote from said first deflection retrace resonant circuit to increase the current through said impedance during the retrace interval, and a second voltage level during at least a portion of the trace interval to decrease the current through said impedance prior to the beginning of said retrace interval and a control circuit coupled to said switched current means for modulating the current through said impedance at a vertical rate in a parabolic manner.

16. A deflection circuit according to claim 15, wherein said switched current means comprises, a first switch for coupling in a closed position thereof said first voltage level to said terminal of said impedance, and a diode for coupling said second voltage level to said terminal of said impedance when said first switch is in an open position thereof.

17. A deflection circuit comprising:
a deflection winding;
switching means coupled to said deflection winding and operated at a deflection rate to generate scanning current in said deflection winding during a trace interval of a deflection cycle;
a deflection retrace capacitance for forming a first deflection retrace resonant circuit with said deflection winding;
a source of supply energy;
a first winding of a flyback transformer coupled to said switching means and said source of supply energy for producing a retrace pulse voltage therein during a retrace interval of said delfection cycle;
an impedance coupled during the retrace interval in a current path between said first deflection retrace resonant circuit and said first winding, said impedance being of substantially higher value than that of said deflection winding;
a source of modulation current coupled to said first deflection retrace resonant circuit through said impedance to achieve east-west correction; and
a second capacitor coupled to said first winding that forms a second resonant circuit therewith, said first and second resonant circuits being coupled to form a combined resonant circuit wherein the retrace pulse voltage in said first winding contains the same synchronization information that is contained in the retrace pulse voltage in said deflection winding.

18. A deflection circuit according to claim 17, wherein said source of modulation current comprises a switched current means for supplying a first voltage level at a terminal of said impedance that is remote from said first deflection retrace resonant circuit to increase the current through said impedance during the retrace interval, and a second voltage level during at least a poriton of the trace interval to decrease the current through said immpedance prior to the beginning of said retrace interval and a control circuit coupled to said switched current means for modulating the current through said impedance at a vertical rate in a parabolic manner.

19. A deflection circuit according to claim 18, wherein said impedance comprises an inductor.

20. A deflection circuit according to claim 18, wherein said switched current means comprises, a first switch for coupling in a closed position thereof said first voltage level to said terminal of said impedance, and a diode for coupling said second voltage level to said terminal of said impedance when said first switch is in an open position thereof.

21. A deflection circuit, comprising:
a deflection winding;
switching means coupled to said deflection winding and operated at a deflection rate to generate scanning current in said deflection winding during a trace interval of a deflection cycle;
a source of supply energy;
a supply inductance coupled to said switching means and said source of supply energy for producing therein a retrace pluse voltage during the retrace interval of the deflection cycle;
a first retrace capacitance that forms a retrace resonant circuit with said deflection winding during the retrace interval of the deflection cycle;
a load circuit coupled to said supply inductance and energized during the retrace interval;
a second retrace capacitance coupled to said supply inductance to form a second resonant circuit that is coupled to said retrace resonant circuit such that said retrace and second resonant circuits form a combined resonant circuit, wherein the resonant frequency of at least one of said retrace and second resonant circuits is lower than the retrace frequency of said scanning current.

22. A deflection circuit according to claim 21 wherein said second resonant circuit comprises a series resonant circuit.

23. A deflection circuit according to claim 1, wherein said retrace resonant circuit comprises a parallel resonant circuit.

24. A deflection circuit according to claim 21, wherein said combined resonant circuit is tuned to the retrace frequency of said scanning current.

* * * * *